United States Patent
Sloss et al.

(10) Patent No.: US 9,828,913 B2
(45) Date of Patent: Nov. 28, 2017

(54) TURBINE HOUSING

(71) Applicant: WESCAST INDUSTRIES, INC., Brantford (CA)

(72) Inventors: Clayton A. Sloss, Paris (CA); Joseph Gerald Jimmie Coulombe, Brantford (CA)

(73) Assignee: WESCAST INDUSTRIES, INC., Brantford (CA)

( * ) Notice: Subject to any disclaimer, the term of this patent is extended or adjusted under 35 U.S.C. 154(b) by 508 days.

(21) Appl. No.: 14/338,579

(22) Filed: Jul. 23, 2014

(65) Prior Publication Data
US 2015/0050131 A1 Feb. 19, 2015

Related U.S. Application Data

(60) Provisional application No. 61/866,641, filed on Aug. 16, 2013.

(51) Int. Cl.
| | |
|---|---|
| *F02C 7/04* | (2006.01) |
| *F01D 9/02* | (2006.01) |
| *F02C 6/12* | (2006.01) |

(52) U.S. Cl.
CPC .............. *F02C 7/04* (2013.01); *F01D 9/026* (2013.01); *F02C 6/12* (2013.01); *F05D 2210/12* (2013.01);
(Continued)

(58) Field of Classification Search
CPC . F01D 9/02; F01D 25/08; F01D 9/026; F01D 25/12; F01D 25/14; F01D 25/145;
(Continued)

(56) References Cited

U.S. PATENT DOCUMENTS

| | | | |
|---|---|---|---|
| 6,553,762 B2 * | 4/2003 | Loffler | F01D 9/026 415/203 |
| 7,802,429 B2 * | 9/2010 | Yokoyama | F01D 9/026 60/605.1 |

(Continued)

FOREIGN PATENT DOCUMENTS

| | | | | |
|---|---|---|---|---|
| DE | WO 2011053513 A2 * | 5/2011 | | F01D 9/026 |
| DE | 102013202073 A1 * | 8/2014 | | F02C 6/12 |

(Continued)

OTHER PUBLICATIONS

Google Translation of DE102013202073 A1.*
(Continued)

*Primary Examiner* — Nathaniel Wiehe
*Assistant Examiner* — Brian O Peters
(74) *Attorney, Agent, or Firm* — Harness, Dickey & Pierce, P.L.C.

(57) ABSTRACT

A turbocharger system may include a turbine housing and a tongue insert. The turbine housing may include an inlet, an outlet, and a gas pathway between the inlet and outlet. The gas pathway may include a volute portion and an inlet portion extending approximately tangent to the volute portion. The turbine housing may be formed from a first material. The tongue insert may be received in the turbine housing and may at least partially define the volute portion and the inlet portion. The tongue insert may be formed from a second material that is more heat resistant than the first material.

4 Claims, 5 Drawing Sheets

(52) U.S. Cl.
CPC ...... *F05D 2220/40* (2013.01); *F05D 2240/15* (2013.01); *F05D 2260/20* (2013.01); *F05D 2260/231* (2013.01); *F05D 2300/121* (2013.01); *F05D 2300/502* (2013.01); *F05D 2300/5023* (2013.01); *F05D 2300/50212* (2013.01)

(58) Field of Classification Search
CPC ........ F01D 25/24; F01D 25/26; F01D 17/105; F04D 29/422; F04D 29/428; F04D 29/403; F04D 29/5853; F01P 260/12; F02C 6/12; F02C 7/24
See application file for complete search history.

(56) References Cited

U.S. PATENT DOCUMENTS

| | | | | |
|---|---|---|---|---|
| 8,621,865 | B2* | 1/2014 | Mehring | ................ F01D 25/14 60/605.3 |
| 9,097,121 | B2* | 8/2015 | Joergl | .................... F01D 9/026 |

| | | | |
|---|---|---|---|
| 2011/0008158 | A1 | 1/2011 | Boening et al. |
| 2011/0236198 | A1 | 9/2011 | Fahl |
| 2012/0067306 | A1 | 3/2012 | Mehring et al. |
| 2012/0201655 | A1 | 8/2012 | Kusakabe et al. |
| 2012/0251315 | A1 | 10/2012 | Watanabe et al. |
| 2013/0108414 | A1 | 5/2013 | Maeda et al. |

FOREIGN PATENT DOCUMENTS

| | | |
|---|---|---|
| FR | 2795769 A1 | 1/2001 |
| WO | 2010039590 A2 | 4/2010 |
| WO | 2011091129 A2 | 7/2011 |
| WO | 2012062407 A1 | 5/2012 |
| WO | 2012127531 A1 | 9/2012 |

OTHER PUBLICATIONS

International Search Report and Written Opinon regarding Application No. PCT/IB2014/063391, dated Nov. 6, 2014.
Extended European Search Report regarding Application No. PCT/IB2014063391, dated Jan. 9, 2017.

* cited by examiner

TURBINE HOUSING

CROSS-REFERENCE TO RELATED APPLICATIONS

This application claims the benefit of U.S. Provisional Application No. 61/866,641, filed on Aug. 16, 2013. The entire disclosure of the above application is incorporated herein by reference.

FIELD

The present disclosure relates to turbine housings for turbocharger systems.

BACKGROUND

This section provides background information related to the present disclosure and is not necessarily prior art.

A significant proportion of the cost of a turbocharger assembly is contained within the turbine housing. The turbine housing receives hot gas from an exhaust system, channels it through a volute section to a turbine, and finally directs turbine discharge gases to the rest of the exhaust system. A material or materials from which the turbine housing is formed should be able to withstand a maximum expected temperature due to the hot exhaust gases. For many applications the high exhaust gas temperature causes the turbine housing temperature to exceed the working limit of traditional low cost ferritic cast irons, and as a result, highly alloyed, temperature resistant materials such as Ni-Resist (D5S) or austenitic stainless steels (e.g. 1.4848 and 1.4849) are often required. These high alloy materials are expensive and add substantial cost to the overall assembly.

In order to keep the cost of a turbine housing low, it may be desirable to make the turbine housing from a low cost material such as ferritic cast iron or aluminum. A material such as aluminum may not be heat resistant enough to operate at the working temperatures of most turbine housings, and may require active cooling to keep the aluminum housing within practical temperature limits. For many aluminum alloys, this means keeping the aluminum material well below 300° C. at all locations.

As the cost of expensive alloys such as nickel continues to rise in the future, there will be increased interest by the engine and turbocharger manufacturers to reduce the cost of the turbocharger system by employing low cost and/or lightweight materials (possibly with active cooling if required) for the turbine housing. It is to this end that the present disclosure is made.

SUMMARY

This section provides a general summary of the disclosure, and is not a comprehensive disclosure of its full scope or all of its features.

The present disclosure involves a turbocharger system disposed in an exhaust gas stream that is discharged from an engine system. The turbocharger system includes a turbine housing that encases a rotating turbine wheel that converts energy in the exhaust stream into rotational shaft energy. The turbine housing has an internal gas conduit to direct the exhaust gases to the turbine wheel in an efficient manner. The gas conduit has an entry section that is approximately tangent to the outer diameter of the turbine wheel and a second section that surrounds the turbine wheel and is approximately concentric with it. In the region where the gas conduit entry (first) section meets the annular gas conduit (second) section, the turbine housing may include a bifurcation feature that is commonly referred to as a tongue of the turbine housing. The tongue is exposed on two sides to hot exhaust gases and may heat up very quickly.

Aluminum cannot withstand the high temperatures encountered in an automotive exhaust system, so it must be actively cooled to a temperature that is within its working limit. Putting water jackets in an aluminum turbine housing and using the engine's cooling system is an approach to try to solve the thermal durability problem of an aluminum turbine housing. With a water cooled aluminum turbine housing, the outer surface temperature of the turbine housing is relatively cool (usually under 120° C.) which allows for other components in the engine compartment to be located much closer to the turbocharger assembly than in the case of an uncooled turbine housing. In addition to providing better packaging conditions and lower mass, an aluminum water cooled turbine housing presents a possible cost savings compared to traditional high-alloy ferrous materials such as austenitic stainless steel. Even in the case of a turbine housing made from a ferrous alloy, there is a desire to keep the cost of the housing as low as possible by using low cost materials. The application of low cost ferrous alloys is often limited by the thermal durability limits of the material, in which the tongue of the turbine housing usually presents the most critical limitation due to the extreme thermal loads placed on the tongue due to its geometry and function.

The major problem being addressed with the embodiments presented in this disclosure is the durability of the tongue part of a turbine housing, whether the turbine housing is constructed from conventional ferrous alloys or is made with alternative materials with cooling. In the case of water cooled turbine housings, the tongue area of the turbine housing must be relatively thin to not interfere with the flow of exhaust gases in the internal gas conduit, and there is insufficient room to incorporate cooling channels in the tongue. Even though the thermal conductivity of aluminum is fairly high compared to most high temperature ferrous materials, the tongue part of an aluminum water cooled turbine housing limits the maximum operating conditions (temperature and mass flow rate) that the aluminum turbine housing can withstand.

In the present disclosure, methods of replacing the material in the tongue part with a second, temperature resistant, material are provided. A first method uses a component that is inserted into the assembly from the turbine housing inlet. A second method employs a component inserted into the main turbine housing in a manner that is parallel to the axis of rotation of the turbine.

In one form, the present disclosure provides a turbocharger system that may include a turbine housing and a tongue insert. The turbine housing may include an inlet, an outlet, and a gas pathway between the inlet and the outlet. The gas pathway may include a volute portion and an inlet portion extending approximately tangent to the volute portion. The turbine housing may be formed from a first material. The tongue insert may be received in a groove in the turbine housing and may at least partially define the volute portion and the inlet portion. The tongue insert may be formed from a second material that is more heat resistant than the first material.

In some embodiments, the tongue insert may include a depression or recess defining a gap between the tongue insert and the inlet portion.

In some embodiments, the groove may include a depression or recess defining a gap between the tongue insert and the inlet portion.

In some embodiments, the groove may extend through an inlet interface defining the inlet of the turbine housing.

In some embodiments, the groove may include an end stop locator that locates the tongue insert relative to the turbine housing.

In some embodiments, the tongue insert may engage the groove by a press fit.

In some embodiments, the turbine housing may include a coolant passage formed therein.

In another form, the present disclosure provides a turbocharger system that may include a turbine housing and a tongue insert. The turbine housing may include an inlet, an outlet, and a gas pathway between the inlet and outlet. The gas pathway may include a volute portion and an inlet portion extending approximately tangent to the volute portion. The turbine housing may be formed from a first material. The tongue insert may be received in the turbine housing and may at least partially define the volute portion and the inlet portion. The tongue insert may be formed from a second material that is more heat resistant than the first material. The tongue insert may include a ring portion a tongue portion extending from the ring portion.

In some embodiments, the ring portion may be concentric with a shaft of a turbine disposed within the turbine housing.

In some embodiments, the ring portion may be sandwiched between the turbine housing and a turbine bearing housing.

In some embodiments, the tongue portion may be received in a recess in the turbine housing.

In some embodiments, the turbine housing may include a coolant passage formed therein.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
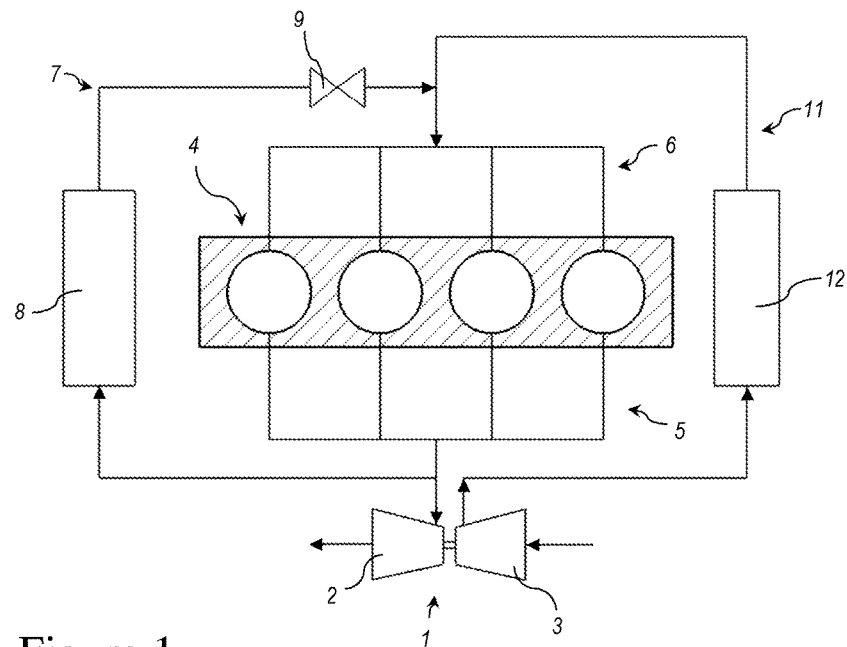
FIG. 1 is a schematic representation of a turbocharged engine system.

Example embodiments will now be described more fully with reference to the accompanying drawings. It should be understood that throughout the drawings, corresponding reference numerals indicate like or corresponding parts and features. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, and devices, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a turbocharger system 1 of a turbocharged engine 4 includes a turbine 2 which may be disposed in an exhaust gas flow path of an exhaust system 5 of a combustion engine 4. The turbocharger system 1 may extract energy from the hot exhaust gases and use that energy to compress intake air that is compressed in a compressor 3. The compressed intake air may be subsequently cooled in an intercooler heat exchanger 12 before travelling through the intake air system 11 to an intake air distribution system, such as an intake air manifold 6. The intake air is mixed with fuel in the engine 4 and ignited to produce power and also generate more hot exhaust gases to drive the turbine 2. Optionally, the engine system may include an exhaust gas recirculation (EGR) circuit 7 which may include an EGR cooler 8 and an EGR valve 9 to route, cool, and meter a portion of the exhaust gases to mix with the intake air in the intake air system 11 to control the combustion in the engine 4.

With reference to FIGS. 2 through 6, the turbine housing 10 may be attached to the engine, exhaust manifold, or upstream exhaust system at an inlet interface 70 of the turbine housing 10. Exhaust gases from the turbine 2 are discharged from the turbine housing outlet 82. An outlet interface 80 of the turbine housing 10 joins a turbine housing outlet gas conduit 82 with the downstream exhaust system (not shown) so the exhaust gases can be handled appropriately in the remainder of the exhaust system (e.g., in an exhaust aftertreatment system, for example). The turbine housing 10 may contain the turbine 2, which may include a rotating assembly of blades that converts the energy in the exhaust gases into shaft work. The turbine 2 and its shaft are located and supported by a bearing housing (not shown). The bearing housing is connected to the turbine housing 10 at a turbine bearing housing interface 90.

A function of the turbine housing 10 is to channel and direct the exhaust gases from the engine system and present the exhaust gases to the turbine in a manner that will effectively convert some of the energy in the exhaust gases into kinetic energy of the rotating turbine blades and shaft. The turbine housing 10 may include an exhaust gas path 98 upstream of the turbine that may channel and direct the exhaust gas to the turbine. The exhaust gas path 98 may include first and second sections 100, 110. The first section 100 of the exhaust gas path 98 may receive the exhaust gases from the engine or upstream exhaust system (not shown) through the turbine housing inlet 60. This first section 100 of the gas path 98 may be approximately tangential to the second section 110 of gas path 98. The second section 110 may be referred to the volute, and may be an annular gas path that receives the exhaust gases from the first section 100 of the gas path 98. The second section 110 may channel the exhaust gases to the turbine wheel around its circumference.

The exhaust gases can be very hot; often reaching 800 to 900° C. in diesel engines and 950 to 1050° C. in gasoline engines of current passenger vehicles (future exhaust gas temperatures may be even higher). A tongue portion 40 of a tongue insert 30 may be provided at or near the intersection of the first and second sections 100, 110 of the exhaust gas path 98 in the turbine housing 10. The tongue insert 30 forms a separation between the first and second sections 100, 110 of the gas path 98, and is subjected to high convective heat transfer loads due to high exhaust gas temperatures and gas velocities.

Figure 2:
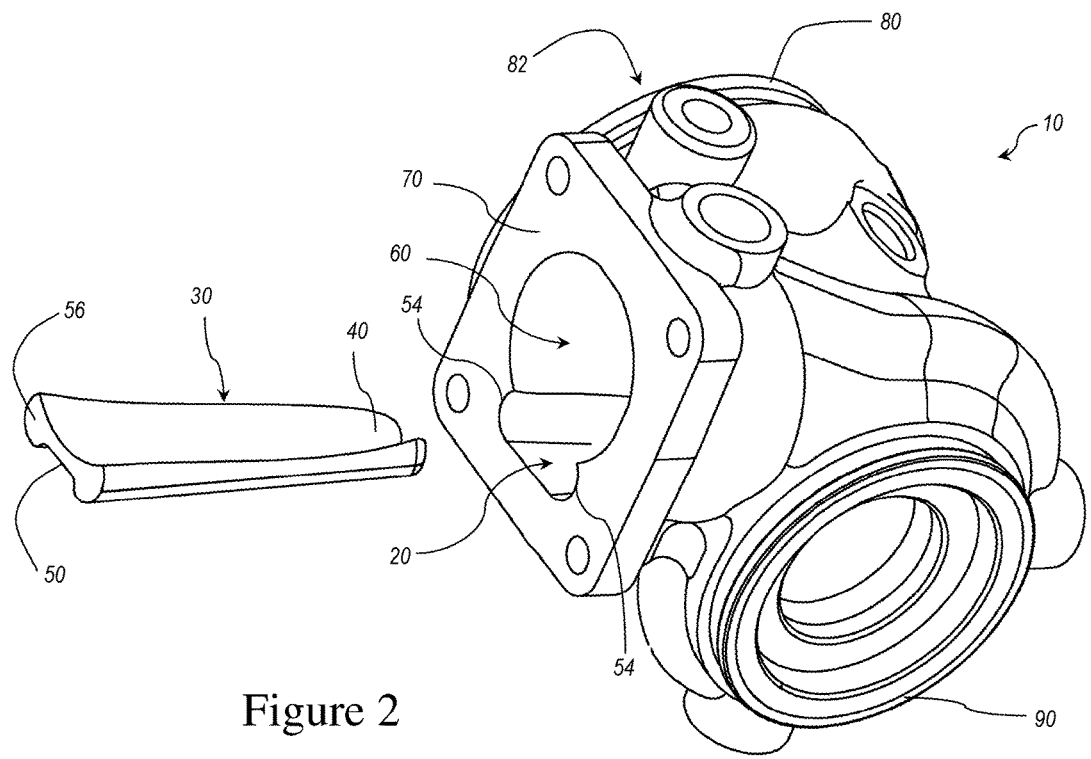
FIG. 2 is an exploded perspective view of a turbine housing and tongue insert according to the principles of the present disclosure.
Figure 3:
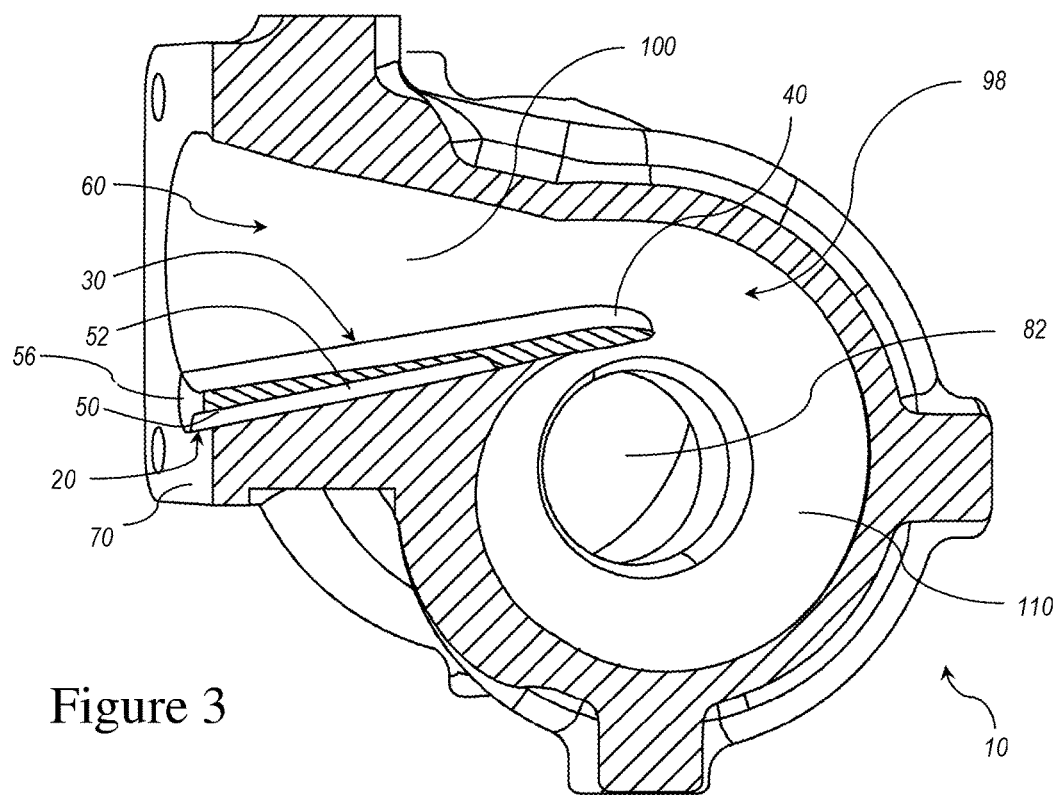
FIG. 3 is a perspective section view of the turbine housing and tongue insert of FIG. 2.
Figure 4:
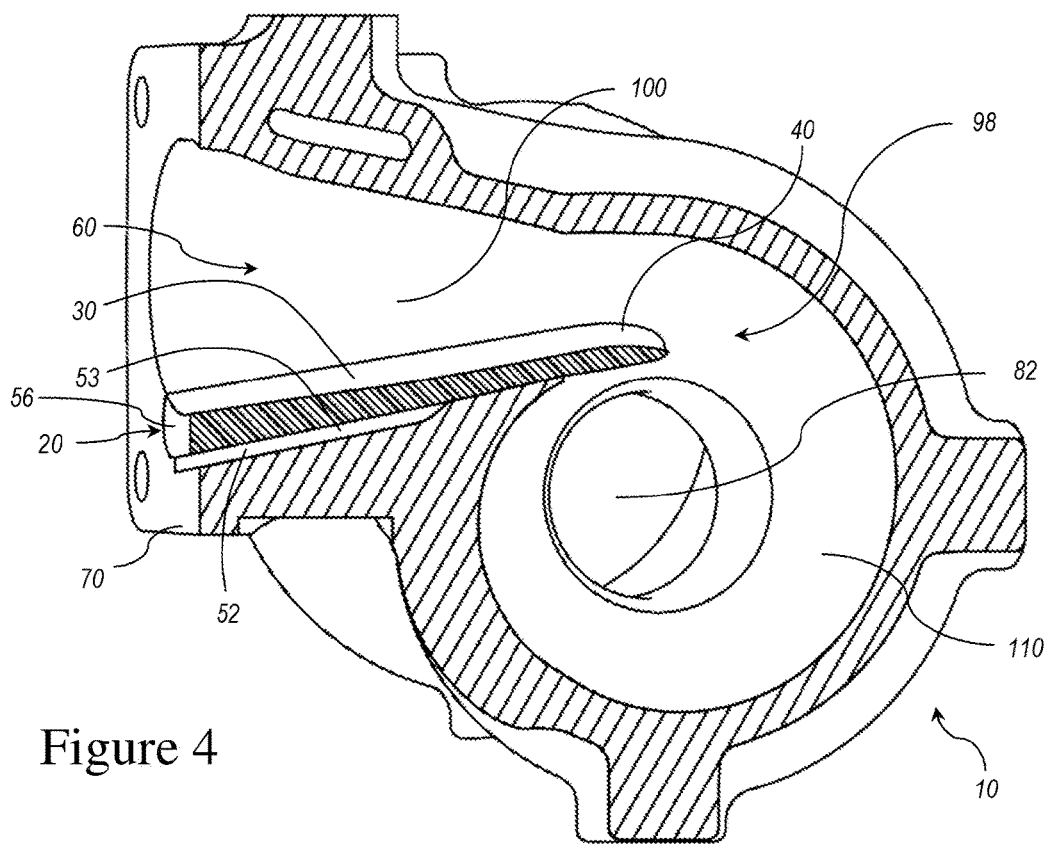
FIG. 4 is a perspective section view of the turbine housing of FIG. 2 with an alternative tongue groove.

The tongue insert 30 may be received in a groove or recess 20 in the turbine housing 10. As shown in FIGS. 2-4, the groove 20 may be formed in at least a portion of the first section 100 at the inlet 60 and may extend through the inlet interface 70. In this manner, it is possible to form the tongue insert 30 from a different material than a material from which the rest of the turbine housing 10 is formed. This allows for the option to use, for example, a more temperature resistant material for the tongue insert 30. It also allows for a partial decoupling of the thermally induced mechanical stresses between the tongue insert 30 and the turbine housing 10 which provides durability benefits. Furthermore, the use of the tongue insert 30 permits an air gap or insulation space 52 to be easily formed between the tongue insert 30 and the turbine housing 10. In the embodiment shown in FIGS. 2 and 3, the insulation space 52 is formed by a depression or recess 50 formed in the tongue insert 30. The air gap or insulation space 52 reduces the heat transfer between the tongue insert 30 and the turbine housing 10. Alternatively, as shown in FIG. 4, the air gap or insulation space 52 can be formed by a depression or recess 53 in the tongue groove 20 or in turbine housing 10, adjacent to the tongue insert 30.

Figure 5:
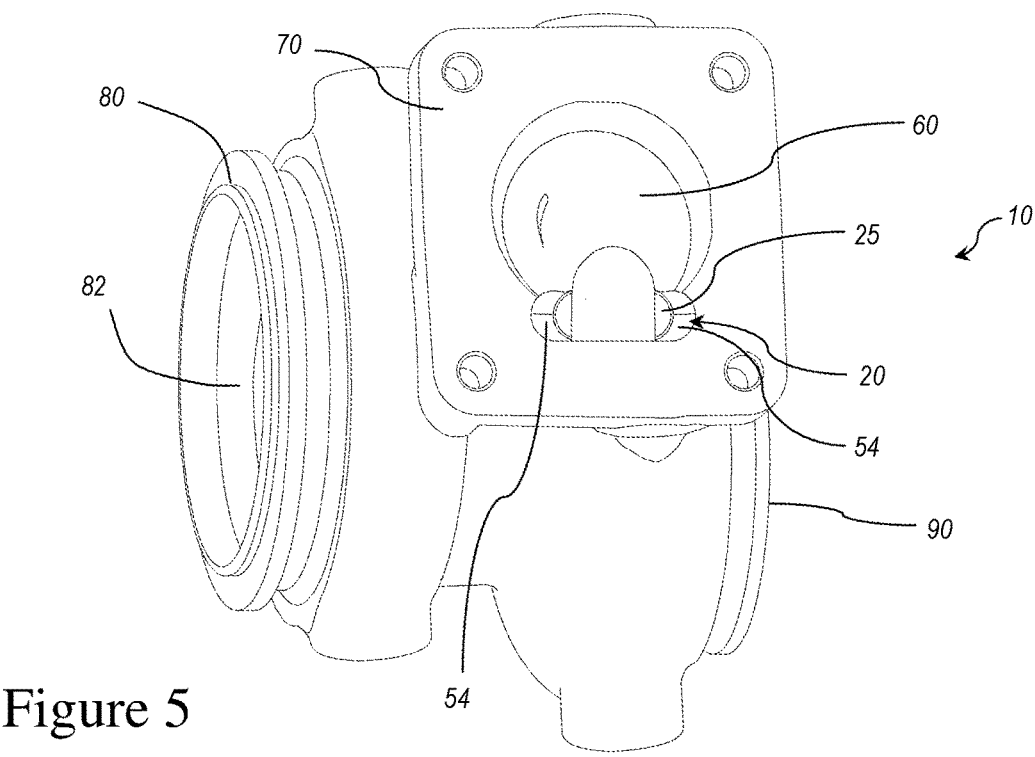
FIG. 5 is a perspective view of the turbine housing of FIG. 2, shown with the tongue insert removed.
Figure 6:
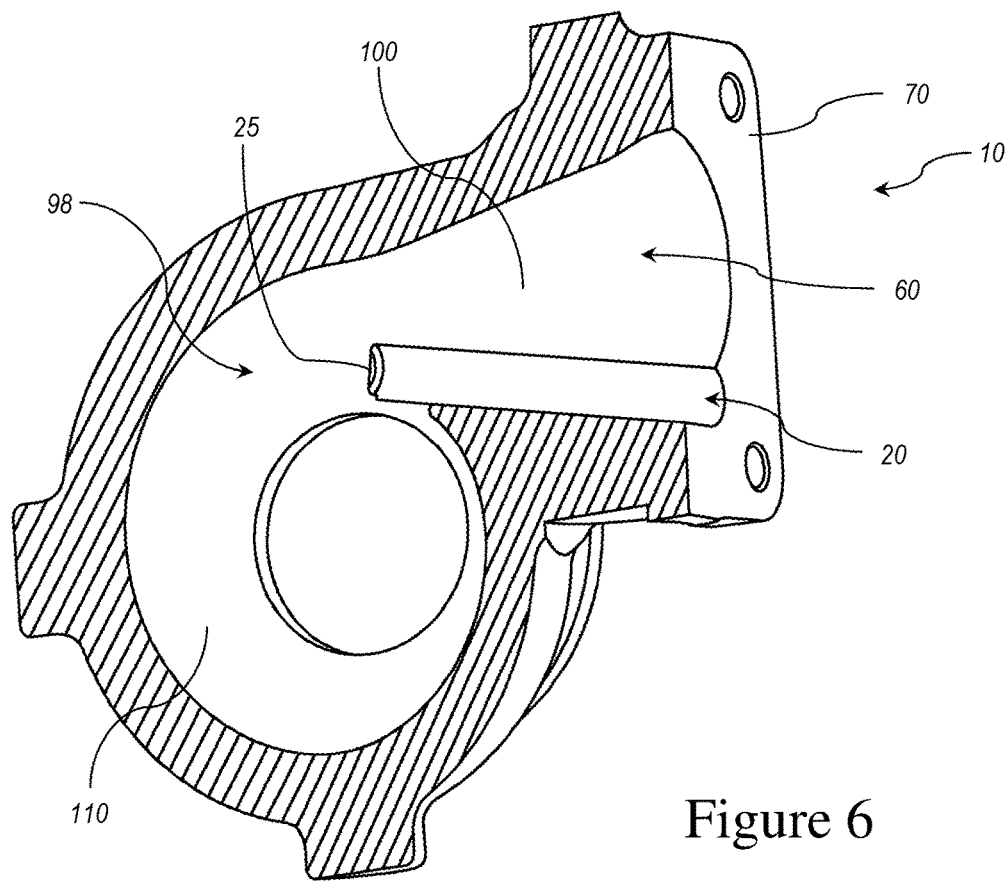
FIG. 6 is a perspective section view of the turbine housing of FIG. 2, shown with the tongue insert removed.
Figure 7:
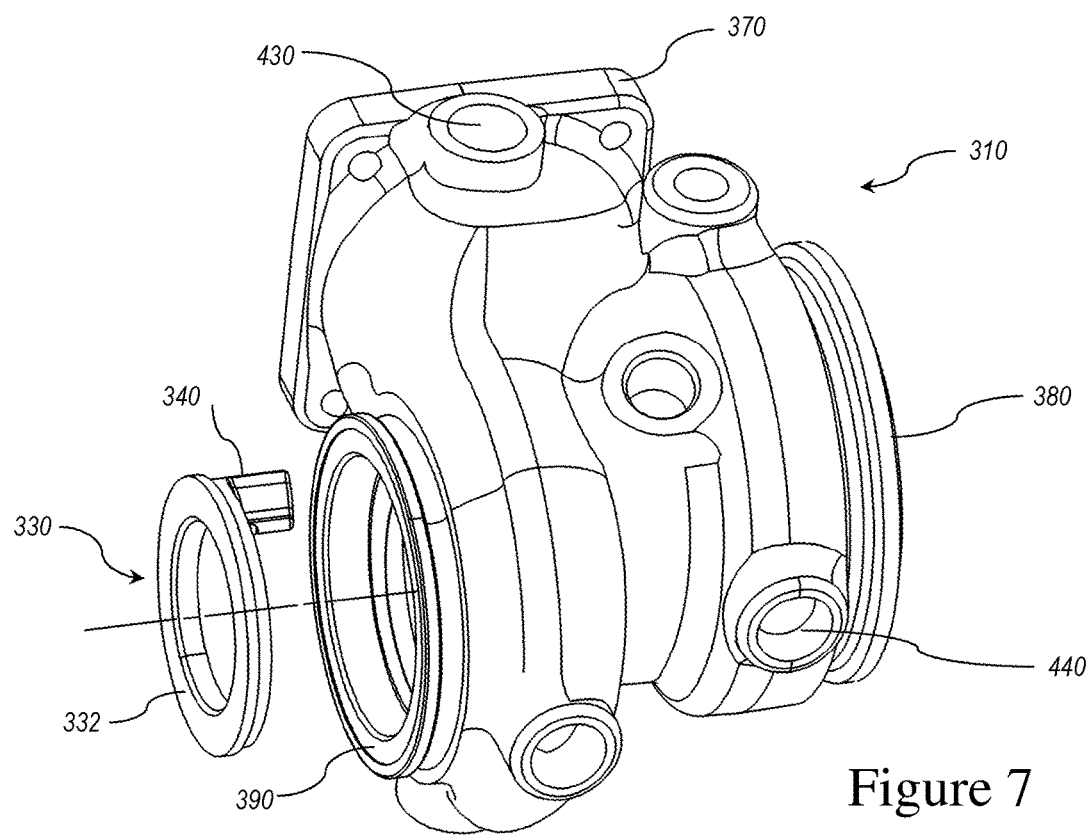
FIG. 7 is an exploded perspective view of another turbine housing and tongue insert according to the principles of the present disclosure.

As shown in FIG. 5, the tongue groove 20 may include relatively large radii 54 at the corners to permit easy clean-up of the casting by a machining process. The tongue groove 20 may locate and hold the tongue insert 30 in the desired position. In the embodiment shown in FIG. 3, for example, an upstream exhaust component (e.g., an exhaust manifold or an exhaust pipe) may mate against an outer face 56 of the tongue insert 30 to prevent the tongue insert 30 from sliding out of the tongue groove 20. As well, there are features along the tongue insert 30 and corresponding geometrical features along the tongue groove 20 that seat the tongue insert 30 at the correct location along the tongue groove 20. In the embodiment shown in FIG. 5, an end stop locator 25 defines the seated location of the tongue insert 30 in the tongue groove 20. The end stop locator 25 may be any similar feature that is created by a change in the width, height, or length of the tongue insert 30 that defines the seated location for the tongue insert 30.

In some turbine housing applications, it may not be possible or practical to use the tongue insert 30 that is inserted into the turbine housing 10 through the inlet 60 at the inlet interface 70. This may be because the geometry is too complicated in the first section 100 of the gas path 98 in the turbine housing 10 to allow for a tongue insert 30 to be inserted easily or if there are other geometric limitations such as cooling water jackets or other sub-system components such as a waste gate assembly. Another example where it may not be possible or practical to incorporate the tongue insert 30 in the manner illustrated in FIGS. 2 through 6 is in the case of an integrated turbo-manifold. Generally, a turbo-manifold combines an exhaust manifold and a turbine housing into a single component, and therefore there may not be access to the turbine housing inlet to install a tongue insert.

With reference to FIGS. 7 to 10 another tongue insert 330 is provided that may be incorporated into a turbine housing 310. The turbine housing 310 may be an integrated turbo-manifold, for example. The tongue insert 330 may include a ring 332 having a tongue part 340 extending from the ring 332. The tongue insert 330 may be inserted into the turbine housing 310 through a turbine bearing housing interface 390. Exhaust gases from the upstream engine or exhaust component (not shown) are passed into an inlet 458 of the turbine housing 310 and are discharged through an outlet 460 of the turbine housing 310. The turbine housing 310 is connected to the upstream exhaust delivery system at an inlet interface 370 and connected to the downstream exhaust system at an outlet interface 380.

The turbine housing 310 is an example of a water cooled (or coolant cooled) turbine housing. A coolant (e.g., from the engine or vehicle cooling system) may be circulated throughout cooling channels 450 within the turbine housing 310 to cool the turbine housing 310 material. With active cooling, a lower cost material, or even a low density material like aluminum can be used at application temperatures above the service temperature of the same material if it was not cooled. The coolant medium enters the cooling channels 450 in the turbine housing 310 through a coolant inlet 430 and exits the cooling channels 450 through a coolant outlet 440.

Figure 8:
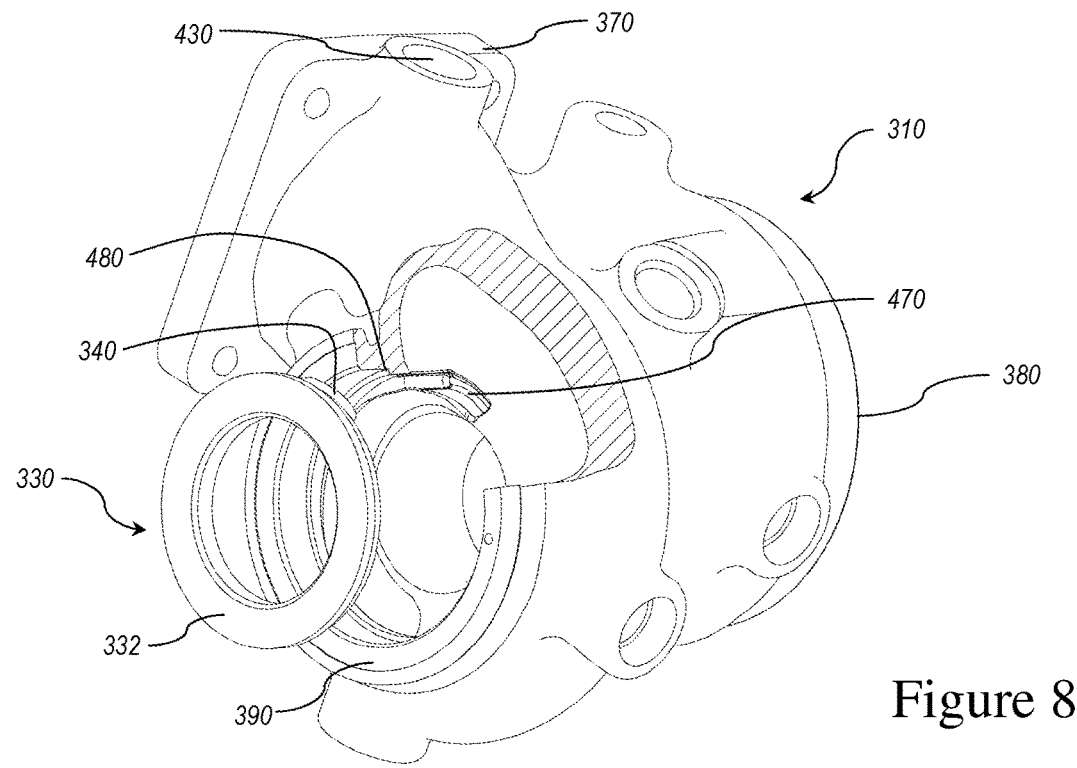
FIG. 8 is an exploded perspective section view of the turbine housing and tongue insert of FIG. 7.
Figure 9:
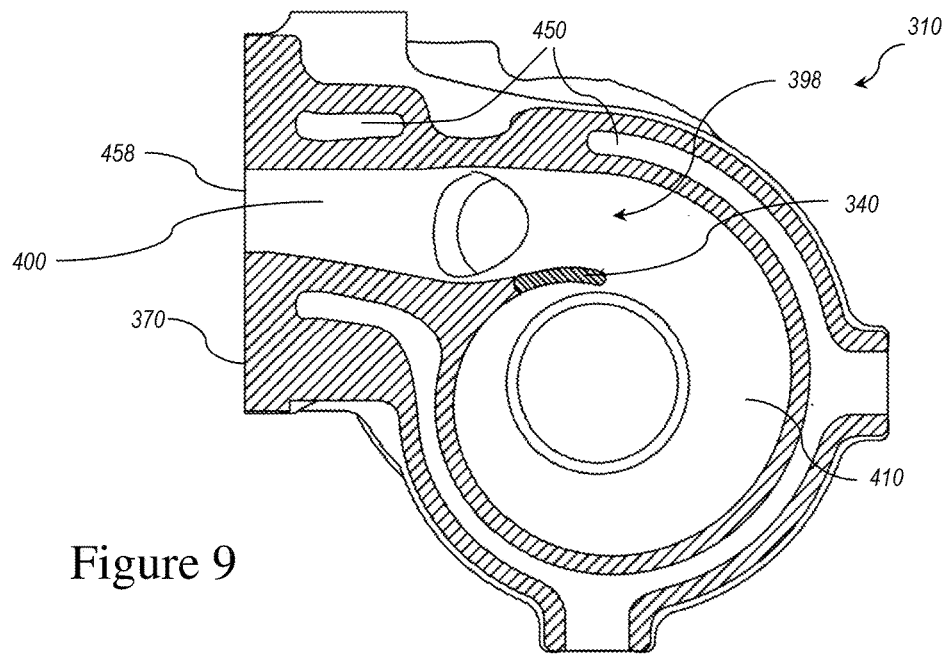
FIG. 9 is a section view of the turbine housing of FIG. 7.
Figure 10:
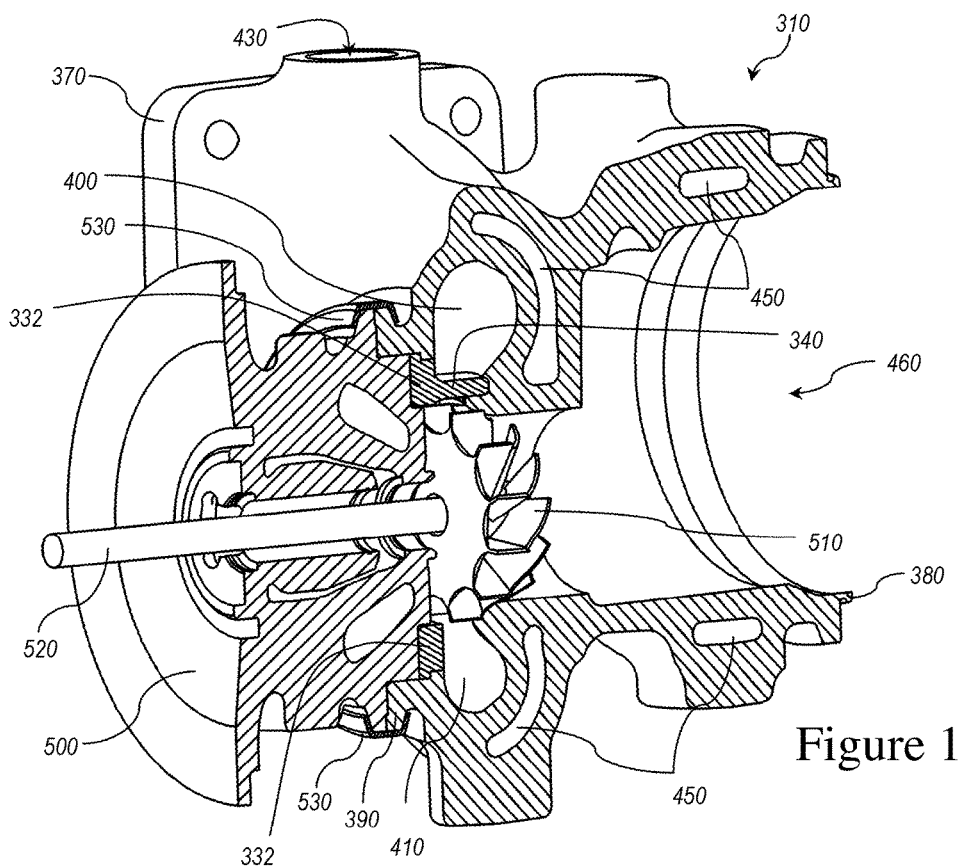
FIG. 10 is a perspective section view of the turbine housing and tongue insert of FIG. 7, assembled with a turbine and turbine bearing housing.

In FIGS. 9 and 10 it can be seen how the tongue part 340 separates the turbine housing gas conduit 398 into a first section 400 and a second section 410. As well, it can be seen that the tongue part 340 may fit into a slight recess or tongue part receptacle 470 formed in the turbine housing 310 as shown in FIG. 8. The tongue part receptacle 470 receives the tongue part 340 and helps to locate the tongue insert 330 in a rotational manner. The axial and radial/normal positions of the tongue insert 330 are fixed by corresponding features in the tongue insert interface 480 that may be finished by machining operations to ensure accurate positioning. The other possible degree of freedom with respect to the exact positioning of the tongue insert 330 in the turbine housing 310 is fixed by the installation of a turbine bearing housing 500 to the turbine housing 310 at the turbine bearing housing interface 390, as shown in FIG. 10. The turbine bearing housing 500 may be held to the turbine housing 310 by means of a v-band clamp 530. The turbine bearing housing 500 supports and locates a turbine shaft 520. A turbine 510 is fixed at one end of the turbine shaft 520.

Although the tongue insert 30 was shown with an uncooled turbine housing and the tongue insert 330 was shown with a cooled turbine housing, it should be noted that it may be possible to use either tongue insert 30, 330 with cooled or uncooled turbine housings. All embodiments allow for the use of a tongue insert material that is different than the turbine housing material. The embodiments shown here may also allow for differential thermal expansion between the tongue insert and the turbine housing without corresponding large thermally induced stresses either because a material with low thermal expansion is used for the tongue insert or the relative arrangement of the tongue insert does not impart large loads or deflection on the turbine housing.

While the cited examples and discussion generally relate to turbochargers placed in the exhaust system of automobile engines and on-road vehicle engines, the general concepts discussed herein are also applicable to other "turbocharger applications" such as stationary engines and engine systems for ships and locomotives, for example. The principles of the present disclosure can be employed in exhaust systems associated with internal or external combustion systems for stationary or mobile applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A turbocharger system comprising:
a turbine housing including an inlet, an outlet, and a gas pathway between the inlet and outlet, the gas pathway including a volute portion and an inlet portion extending approximately tangent to the volute portion, the turbine housing being formed from a first material; and
a tongue insert received in the turbine housing and at least partially defining the volute portion and the inlet portion, the tongue insert being formed from a second material that is more heat resistant than the first material and including an annular ring portion and a non-annular tongue portion, the tongue portion extending axially outward from an axial end of the ring portion and into the volute portion, the tongue portion defining an intersection between the inlet portion and the volute portion,
wherein the ring portion encircles a rotational axis of a shaft of a turbine disposed within the turbine housing,
wherein the ring portion has an inner diameter that is larger than an outermost diameter of a blade of the turbine,
wherein the entire ring portion is disposed within the turbine housing, and
wherein the ring portion at least partially defines the volute portion of the gas pathway.

2. The turbocharger system of claim 1, wherein the ring portion is sandwiched between the turbine housing and a turbine bearing housing.

3. The turbocharger system of claim 2, wherein the tongue portion is received in a recess in the turbine housing.

4. The turbocharger system of claim 3, wherein the turbine housing includes a coolant passage formed therein.

* * * * *